Aug. 30, 1932.   H. C. KUNKELMAN ET AL   1,875,026
COUNTER FOR MACHINES
Filed July 13, 1928   2 Sheets-Sheet 1
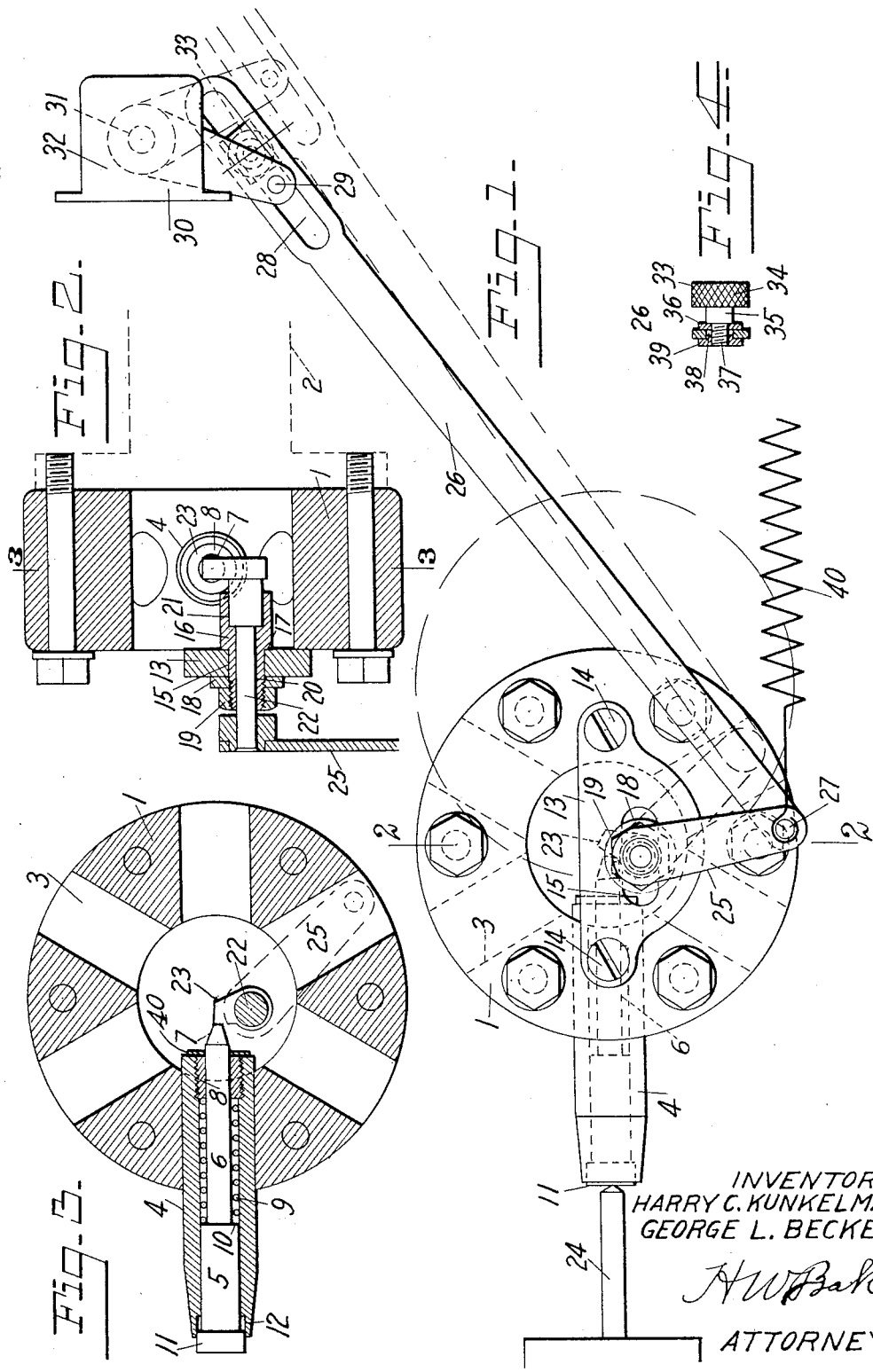
INVENTORS.
HARRY C. KUNKELMAN.
GEORGE L. BECKER.
H W Baker
ATTORNEY.

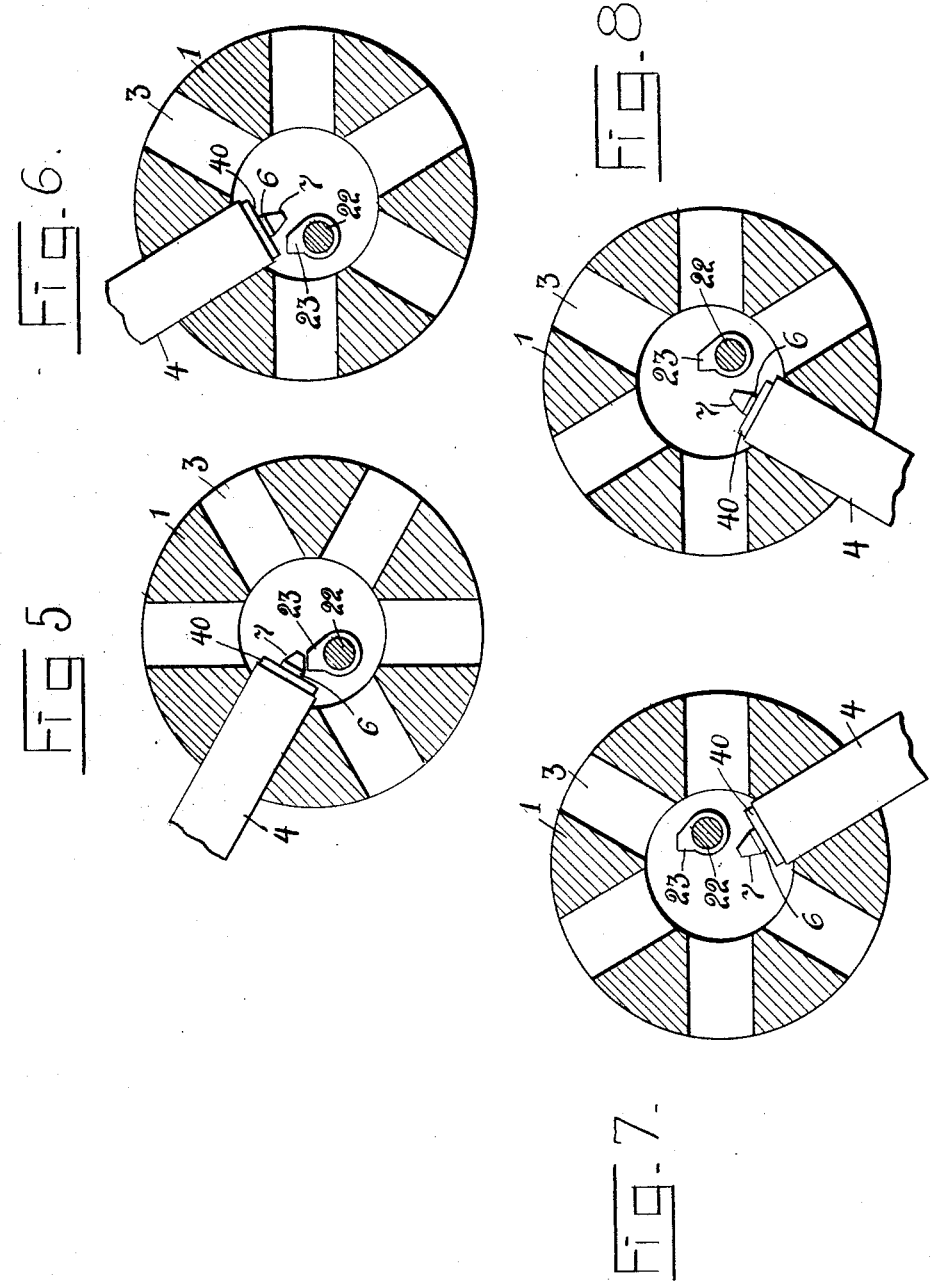

Patented Aug. 30, 1932

1,875,026

UNITED STATES PATENT OFFICE

HARRY C. KUNKELMAN AND GEORGE L. BECKER, OF DAYTON, OHIO, ASSIGNORS TO OHMER FARE REGISTER COMPANY, OF DAYTON, OHIO

COUNTER FOR MACHINES

Application filed July 13, 1928. Serial No. 292,356.

The object of this invention is to provide an automatic counter whereby a count may be kept of the number of pieces of work accomplished by a machine. In automatic screw machines the part on which the work is to be done, called the stock, is fed forward intermittently and a machine such as an automatic screw machine performs various operations on the said stock, one of which operations is usually the severing of the finished article from the remainder of the stock. It is desirable to count these finished articles and by finished articles we mean the articles on which work is done although it may not be the final finishing process. It is, however, finished so far as that particular machine is concerned. Various means have heretofore been provided to count the number of finished parts turned out but so far as we know such machines have been defective in that they count according to the number of operations that the screw machine makes regardless of whether any stock is being fed forward or not. If no stock was being fed forward the device would continue to count. It is the object of the present invention to provide a counter which is actuated by the stock as it is fed forward so as to count only the effective number of operations and hence the number of completed parts. While we have shown this invention as applicable to automatic screw machines by way of illustration it will be understood that it can be used in many other places.

In the drawings, we have shown the preferred embodiment of this invention by way of illustration, in which—

Fig. 1 is a side elevational view thereof.

Fig. 2 is a cross-sectional elevational view on the line 2—2 of Fig. 1.

Fig. 3 is a cross-sectional view on the line 3—3 of Fig. 2.

Fig. 4 is a cross-sectional view on the line 4—4 of Fig. 1.

Figures 5 to 8 inclusive are views similar to Figure 1 but showing the turret in various of the positions which it would assume during the operation of the same.

Referring more particularly to the drawings,

The turret head 1 is intermittently rotated by the shaft 2 and is moved in a straight line movement into the dotted-line position shown in Fig. 1 at a time when the stock is not being fed forward as is well known in the art. The turret head 1 is provided with the usual bores 3 in one of which is mounted a stop holder 4. In the stop holder 4 is mounted a stop plunger 5 provided with a reduced shank 6 which projects inwardly beyond the inner extremity of the stop holder 4, and is provided with a beveled end 7. A plug 8 is screwed in the inner end of the stop holder 4 and a spring 9 is positioned between the plug 8 and the shoulder 10 of the stop plunger 5. The shank 6 of the plunger 5 has secured thereto a plate 40 which acts as a stop to limit the movement that the spring 9 would impart to the plunger 5. The outer end of the stop plunger 5 is enlarged forming a head 11 seated in a recess 12 which is somewhat larger than the bore of the stop holder 4.

We mount a plate 13 on the turret head 1 securing the same thereto by means of screws 14, which plate 13 is provided with a slot 15. A bearing 16 is mounted in the slot 15, which bearing is held in position by means of a shoulder 17 which engages the plate 13 and by a washer 18 and nut 19. The bearing 16 is provided with a bore 20 and an enlarged bore 21 connecting with the bore 20 and forming an enlarged extension of the bore 20, the two bores being concentric. A shaft 22 is rotatably mounted within the bearing 16 and conforms to the bores 20 and 21. The inner end of the shaft 22 is provided with an arm 23 which arm is so positioned that it will be engaged by the beveled end 7 of the stop plunger 5 whenever the stock 24 is fed forward to engage the head 11 and push the stop plunger 5 inwardly against the tension of the spring 9 thereby partially rotating the arm 23 and shaft 22 in a clockwise direction as viewed in Figs. 1 and 3. The shaft 22 is also provided with an arm 25, which arm is connected to a pitman 26 by means of a wrist pin 27. The pitman 26 is provided with a slot 28 which receives a pin 29 carried by an arm 30 secured to a shaft 31 of a commercial counter 32 secured to a wall or other fixed support.

An adjustable stop 33 is positioned in the slot 28 which stop may be adjusted to any position within the slot 28. This adjustable stop may be of any form, but as shown in Fig. 4 it consists of a knurled head 34 mounted on a shaft 35, which shaft is provided with a flange 36 larger than the distance across the slot 28 and with a threaded shank 37 which receives a nut 38 provided with a flange 39 which is likewise larger than the distance across the slot 28. The adjustable stop may be loosened by rotating the head 34 in one direction and after being manually adjusted to any desired position with the slot 28 the head 34 may be rotated in the opposite direction so as to cause the flanges 36 and 39 to grip the pitman 26.

In operation the turret head 1 is intermittently rotated so as to bring the head 11 of the stop plunger 5 into position to be engaged by the stock 24 when it is subsequently fed forward. The stock 24 on being fed forward engages the head 11 and pushes the beveled end 7 of the stop plunger 5 against the arm 23 partially rotating the shaft 22 and moving the pitman 26 to the left as viewed in Fig. 1 so that the adjustable stop 33 engages the pin 29 and moves the arm 30 from the position shown in dotted lines in Fig. 1 to that shown in full lines, thereby operating the shaft 31 and the commercial counter 32. After the stock 24 has moved forwardly operating the counter, the turret head 1 is rotated so that the stock 24 may be operated on by any of the other tools, not shown, mounted in the bores 3. As soon as the turret head 1 is rotated so as to release the head 11 from the stock 24 the spring 9 disengages the beveled end 7 from the arm 23 and the spring 40 returns the parts to the position shown in dotted lines in Fig. 1. It will, of course, be understood that the counter 32 is operated by the movement of the shaft 31 as is well known in the art.

The adjustable stop 33 is desirable so that the shaft 31 will be rotated only a given distance regardless of the length of stock that may be fed forward and the resultant movement which may be occasioned to the arm 23 and parts operated thereby.

The turret head 1 is moved into its dotted line position shown in Fig. 1 in a straight line motion and at a time when the stock 24 is not being moved forward. When the turret head 1 is being thus moved in a straight line motion, the beveled end 7 is not against the arm 23. Such a movement would carry the shaft 22 with the turret head. The shaft 22 is free to revolve in its bearing 20 but the spring 40 moves the arm 25 and rod 26 to the right as viewed in Fig. 1 during this movement of the turret head until the pin 29 engages the left-hand end of the slot 28, and thereupon the shaft 22 rotates in a clockwise direction so as not to actuate the arm 30 and the counter 32. The spring 40 is not sufficiently strong in and of itself to actuate the said arm 30. It is to be noted that at this time there is nothing to prevent this rotation of the shaft 22 except the spring 40.

Figure 3 shows the turret head in what might be called its home position or the position in which the stock would abut against and actuate the turret head 11, which would in turn actuate the counter. While the turret head 1 rotates 60 degrees, or to the position shown in Figure 6 and through the position shown in Figure 5, the beveled end 7 of the plunger 5 would engage the upper end of the arm 23 and would rock this arm counter-clockwise against the tension of the spring 40. Prior to reaching its 60 degree position as shown in Figure 6, the beveled end 7 would have passed beyond the arm 23. As the turret head 1 is rotated, the plunger is advanced from its 60 degree position as shown in Figure 6 to its 120 degree and 180 degree positions. The plunger does not come into contact with the arm 23. As shown in Figure 7 the beveled end 7 of the plunger is still out of engagement with the arm 23. Figure 8 shows that the plunger is still out of engagement with the arm 23. As the turret head is rotated from the position shown in Figure 8 to that shown in Figure 3 the arm 23 is brought into a position where the turret head 11 would, when actuated, cause the beveled end 7 thereof to engage the arm 23 so that if stock were now again fed against the end of the turret head 11, the counter would be actuated.

We realize that many changes may be made in the specific form of the invention as shown by way of illustration in the drawings and as described in this specification without departing from the spirit of this invention and we, therefore, desire to claim the invention broadly regardless of the form of embodiment thereof and regardless of the kind of machine with which it may be associated.

Having now described our invention, we claim:

1. In a movable turret head carrying a plunger stop for the material to be fed, an actuating lever for actuating a stationarily mounted register, a shaft, a lever fixed to said shaft and actuated by said plunger, a second lever fixed to said shaft and a link connecting said second lever with the actuating lever of the register.

2. In counting mechanism for rotatable turret head machines, a stationarily mounted counter, a shaft supported by said turret head, a plurality of arms mounted on said shaft, means whereby one of said arms is actuated by the forward movement of the stock to thereby rotate said shaft and the other of said arms, and means operatively connecting the last mentioned arm with said counter.

3. In counting mechanism for rotatable turret head machines, a stationarily mounted counter, a shaft supported by said turret head, a plurality of arms mounted on said shaft, means whereby one of said arms is actuated by the forward movement of the stock to thereby rotate said shaft and the other of said arms, a pitman connected to said last-mentioned arm, and means operatively connecting said pitman with said counter.

4. In counting mechanism for rotatable turret head machines, a stationarily mounted counter, a shaft supported by said turret head and forming a part of the operating means for said counter, an arm whereby said shaft is operated, a pitman, a second arm operatively connected with said shaft, means operatively connecting said pitman and said second arm, and means operatively connecting said pitman with said counter.

5. In counting mechanism for rotatable turret head machines, a plunger adapted to be pushed inwardly by the forward movement of stock, a stationarily mounted counter, a shaft supported by said turret head, a plurality of arms mounted on said shaft, one of which is adapted to be engaged and actuated by said plunger, and means operatively connecting the other of said arms to said counter.

In testimony whereof we affix our signatures.

HARRY C. KUNKELMAN.
GEORGE L. BECKER.